US012766607B2

(12) United States Patent
Ogawa

(10) Patent No.: US 12,766,607 B2
(45) Date of Patent: Oct. 20, 2026

(54) CUTTING INSERT, BODY, AND CUTTING TOOL

(71) Applicant: TUNGALOY CORPORATION, Fukushima (JP)

(72) Inventor: Atsushi Ogawa, Iwaki (JP)

(73) Assignee: TUNGALOY CORPORATION, Fukushima (JP)

( * ) Notice: Subject to any disclaimer, the term of this patent is extended or adjusted under 35 U.S.C. 154(b) by 384 days.

(21) Appl. No.: 18/666,758

(22) Filed: May 16, 2024

(65) Prior Publication Data

US 2024/0390988 A1 Nov. 28, 2024

(30) Foreign Application Priority Data

May 23, 2023 (JP) ................................. 2023-084445

(51) Int. Cl.
*B23B 27/16* (2006.01)

(52) U.S. Cl.
CPC ... *B23B 27/1611* (2013.01); *B23B 2200/0404* (2013.01); *B23B 2200/0485* (2013.01)

(58) Field of Classification Search
CPC ......... B23B 27/1611; B23B 2200/0404; B23B 2200/0485
See application file for complete search history.

(56) References Cited

U.S. PATENT DOCUMENTS

2013/0129434 A1 * 5/2013 Bhagath .................. B23C 5/202
407/51

FOREIGN PATENT DOCUMENTS

JP 5779830 B2 9/2015

* cited by examiner

*Primary Examiner* — Nirvana Deonauth
(74) *Attorney, Agent, or Firm* — Studebaker Brackett PLLC

(57) ABSTRACT

The invention provides a cutting insert, a body, and a cutting tool that can limit thickness while allowing a total of four cutting edges to be used by switching. A cutting insert 30 to be mounted on a body 20 of a cutting tool 10 includes: a first cutting face 411 hexagonal in shape by being made up of one end face 110 of a pair of end faces 110 and 120 opposed to each other; a pair of first cutting edges 311 and 312 formed along a pair of sides 111 and 114 opposed to each other among sides marking off the first cutting face 411; second cutting faces 421 and 422 trapezoidal in shape by being made up of a pair of side faces 210 and 220 opposed to each other; and second cutting edges 321 and 322 each formed along one 210 or 220 of sides marking off each of the second cutting faces 421 and 422.

9 Claims, 9 Drawing Sheets

CUTTING INSERT, BODY, AND CUTTING TOOL

BACKGROUND OF THE INVENTION

Field of the Invention

The present invention relates to a cutting insert, a body, and a cutting tool.

Description of the Related Art

For example, as a cutting tool used to cut an inner surface of a pipe and the like, the cutting tool with a configuration in which a plurality of cutting inserts are arranged in a circumferential direction on an outer periphery of a rotatable body is known. Each of the cutting inserts can be replaced by being removed from the body. For example, as described in Japanese Patent No. 5779830, a cutting tool is also known in which a plurality of cutting edges are provided on one cutting insert, and a cutting edge used for machining can be switched by changing a mounting state of the cutting insert on the body.

For example, in a configuration in which the cutting edge used for machining can be changed by turning the cutting insert 180 degrees around an axis perpendicular to a rotation center axis of the body, it is possible to use two cutting edges placed diagonally opposite each other by switching between the two.

Furthermore, with a configuration in which the cutting insert can be mounted by being turned over, a total of four cutting edges can be used by switching. However, such a configuration will make the cutting insert too thick, which may make it difficult to machine small diameters.

SUMMARY OF THE INVENTION

An object of the present invention is to provide a cutting insert, a body, and a cutting tool that can limit thickness while allowing a total of four cutting edges to be used by switching.

To achieve the above object, the present invention provides a cutting insert to be mounted on a body of a cutting tool, the cutting insert comprising: a first cutting face hexagonal in shape by being made up of one of a pair of end faces opposed to each other; a pair of first cutting edges formed along a pair of sides opposed to each other among sides marking off the first cutting face; second cutting faces trapezoidal in shape by being made up of a pair of side faces opposed to each other; and second cutting edges each formed along one of sides marking off each of the second cutting faces.

On the cutting insert configured as described above, two first cutting edges are available for use, with one of the end faces serving as the first cutting face, and two second cutting edges are also available for use, with the pair of side faces opposed to each other serving as the second cutting faces. That is, by changing a posture and orientation of the cutting insert mounted on the body, a total of four cutting edges can be used by switching.

The cutting insert according to the present invention further comprises primary flanks placed on opposite side of the respective first cutting edges from the first cutting face, wherein angles between the first cutting face and the primary flanks are smaller than 90 degrees.

On the cutting insert configured as described above, since wedge angles of the first cutting edges formed between the first cutting face and the primary flanks are smaller than 90 degrees, cutting resistance occurring during cutting done using the first cutting edges can be reduced.

The cutting insert according to the present invention further comprises secondary flanks placed on opposite side of the respective second cutting edges from the respective second cutting faces, wherein angles between the second cutting faces and the respective secondary flanks are smaller than 90 degrees.

On the cutting insert configured as described above, since wedge angles of the second cutting edges formed between the second cutting faces and the secondary flanks are smaller than 90 degrees, cutting resistance occurring during cutting done using the second cutting edges can be reduced.

To achieve the above object, the present invention provides a body to which a cutting insert is fitted, wherein the cutting insert includes a first cutting face hexagonal in shape by being made up of one of a pair of end faces opposed to each other, a pair of first cutting edges formed along a pair of sides opposed to each other among sides marking off the first cutting face, second cutting faces trapezoidal in shape by being made up of a pair of side faces opposed to each other, and second cutting edges each formed along one of sides marking off each of the second cutting faces, the body comprising: a first mounting seat on which the cutting insert is fitted by being placed in a first posture in which the first cutting edges are usable as cutting edges for use during cutting; and a second mounting seat on which the cutting insert is fitted by being placed in a second posture in which the second cutting edges are usable as cutting edges for use during cutting.

On the body configured as described above, when the cutting insert is fitted on the first mounting seat, two first cutting edges can be used with the cutting insert being placed in the first posture and when the cutting insert is fitted on the second mounting seat, two second cutting edges can be used with the cutting insert being placed in the second posture. That is, the cutting insert can be used by switching a total of four cutting edges. When the cutting inserts are fitted on the first mounting seat and the second mounting seat, respectively, cutting can be done using the first cutting edges of the cutting insert in the first posture and the second cutting edges of the cutting insert in the second posture simultaneously.

In the body according to the present invention, the first mounting seat and the second mounting seat are arranged in an axial direction.

On the body configured as described above, the cutting inserts can be fitted on a front end side and a rear end side. Consequently, for example, rough machining and finish machining can be performed in a single cutting machining using the cutting insert on the front end side and the cutting insert on the rear end side, respectively. By fitting the cutting inserts in the front and rear, the cutting edge length of the tool as a whole can be increased, accommodating deep cutting.

To achieve the above object, the present invention provides a cutting tool comprising: a cutting insert including: a first cutting face hexagonal in shape by being made up of one of a pair of end faces opposed to each other, a pair of first cutting edges formed along a pair of sides opposed to each other among sides marking off the first cutting face, second cutting faces trapezoidal in shape by being made up of a pair of side faces opposed to each other, and second cutting edges each formed along one of sides marking off each of the second cutting faces; and a body including: a first mounting seat on which the cutting insert is fitted by being placed in a first posture in which the first cutting edges are usable as cutting edges for use during cutting, and a second mounting seat on which the cutting insert is fitted by being placed in a second posture in which the second cutting edges are usable as cutting edges for use during cutting.

On the cutting tool configured as described above, two first cutting edges can be used with the cutting insert being placed in the first posture on the first mounting seat of the body and two second cutting edges can be used with the cutting insert being placed in the second posture on the second mounting seat of the body. That is, the cutting insert can be used by switching a total of four cutting edges. Besides, by fitting respective cutting inserts on the first mounting seat and second mounting seat of the body, cutting can be done using the first cutting edges of the cutting insert in the first posture and the second cutting edges of the cutting insert in the second posture simultaneously.

In the cutting tool according to the present invention, the cutting insert includes primary flanks placed on opposite side of the respective first cutting edges from the first cutting face; and angles between the first cutting face and the primary flanks are smaller than 90 degrees.

On the cutting tool configured as described above, since wedge angles of the first cutting edges formed between the first cutting face and primary flanks of the cutting insert are smaller than 90 degrees, cutting resistance occurring during cutting done using the first cutting edges can be reduced.

In the cutting tool according to the present invention, the cutting insert includes secondary flanks placed on opposite side of the respective second cutting edges from the respective second cutting faces; and angles between the second cutting faces and the respective secondary flanks are smaller than 90 degrees.

On the cutting tool configured as described above, since wedge angles of the second cutting edges formed between the second cutting faces and secondary flanks of the cutting insert are smaller than 90 degrees, cutting resistance occurring during cutting done using the second cutting edges can be reduced.

In the cutting tool according to the present invention, the first mounting seat and the second mounting seat are arranged in an axial direction on the body.

On the cutting tool configured as described above, the cutting inserts can be fitted on a front end side and a rear end side of the body. Consequently, for example, rough machining and finish machining can be performed in a single cutting machining using the cutting insert on the front end side and the cutting insert on the rear end side, respectively. By fitting the cutting inserts in the front and rear, the cutting edge length of the tool as a whole can be increased, accommodating deep cutting.

The present invention can provide a cutting insert, a body, and a cutting tool that can limit thickness while allowing a total of four cutting edges to be used by switching.

DETAILED DESCRIPTION OF THE PREFERRED EMBODIMENT

Figure 1:
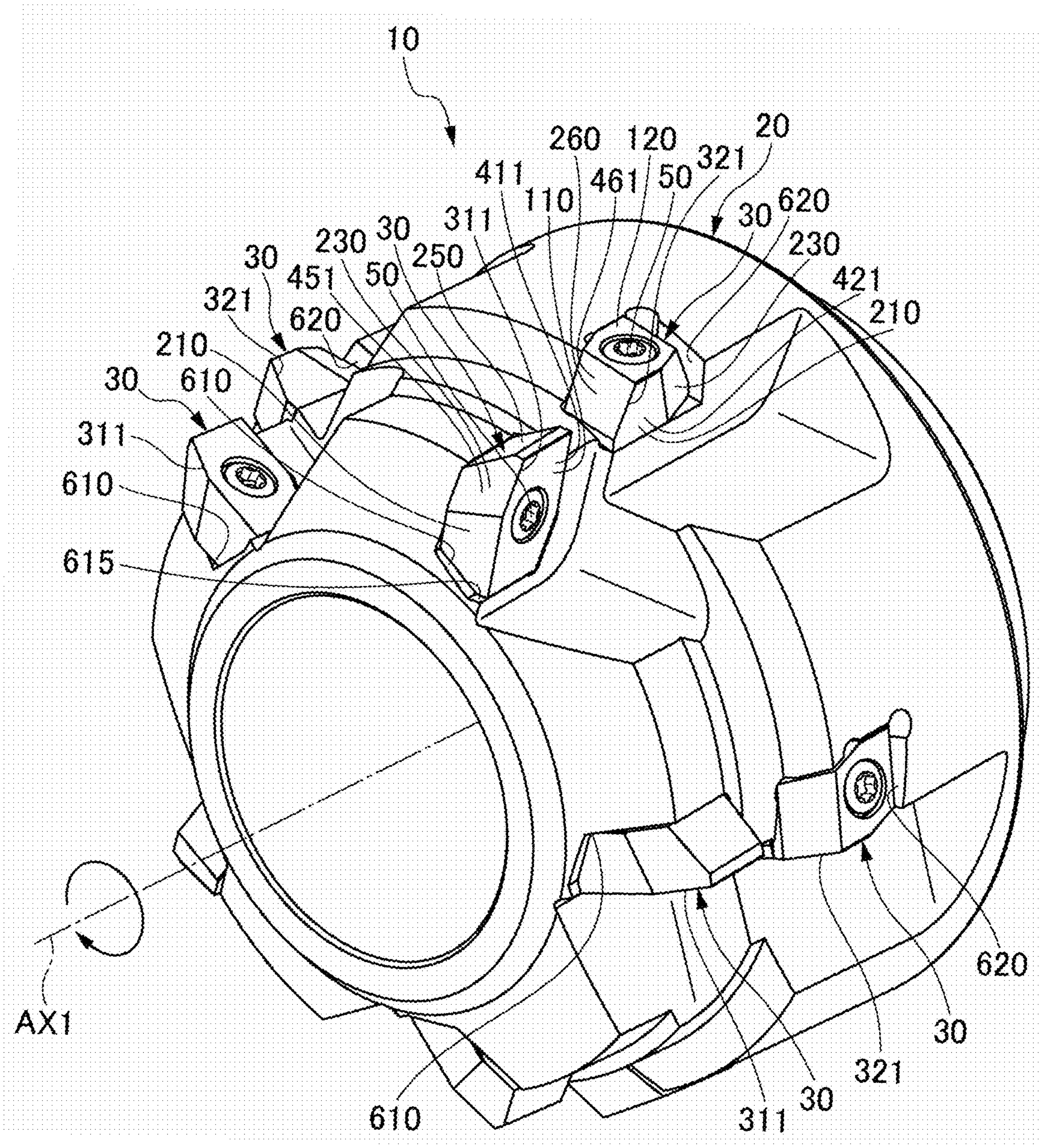
FIG. 1 is a perspective view of a cutting tool equipped with cutting inserts according to an embodiment of the present invention.

An embodiment of the present invention will be described below with reference to the accompanying drawings. To facilitate understanding of the description, the same components in different drawings are denoted by the same reference numerals whenever possible and redundant description thereof will be omitted.

Now, the present embodiment will be described. A cutting tool 10 according to the present embodiment is used to cut an inner surface of a pipe and the like while rotating and is also referred to as a "pull counterboring tool." Note that a configuration of the cutting tool 10 described below is applicable to other cutting tools as well.

Figure 2:
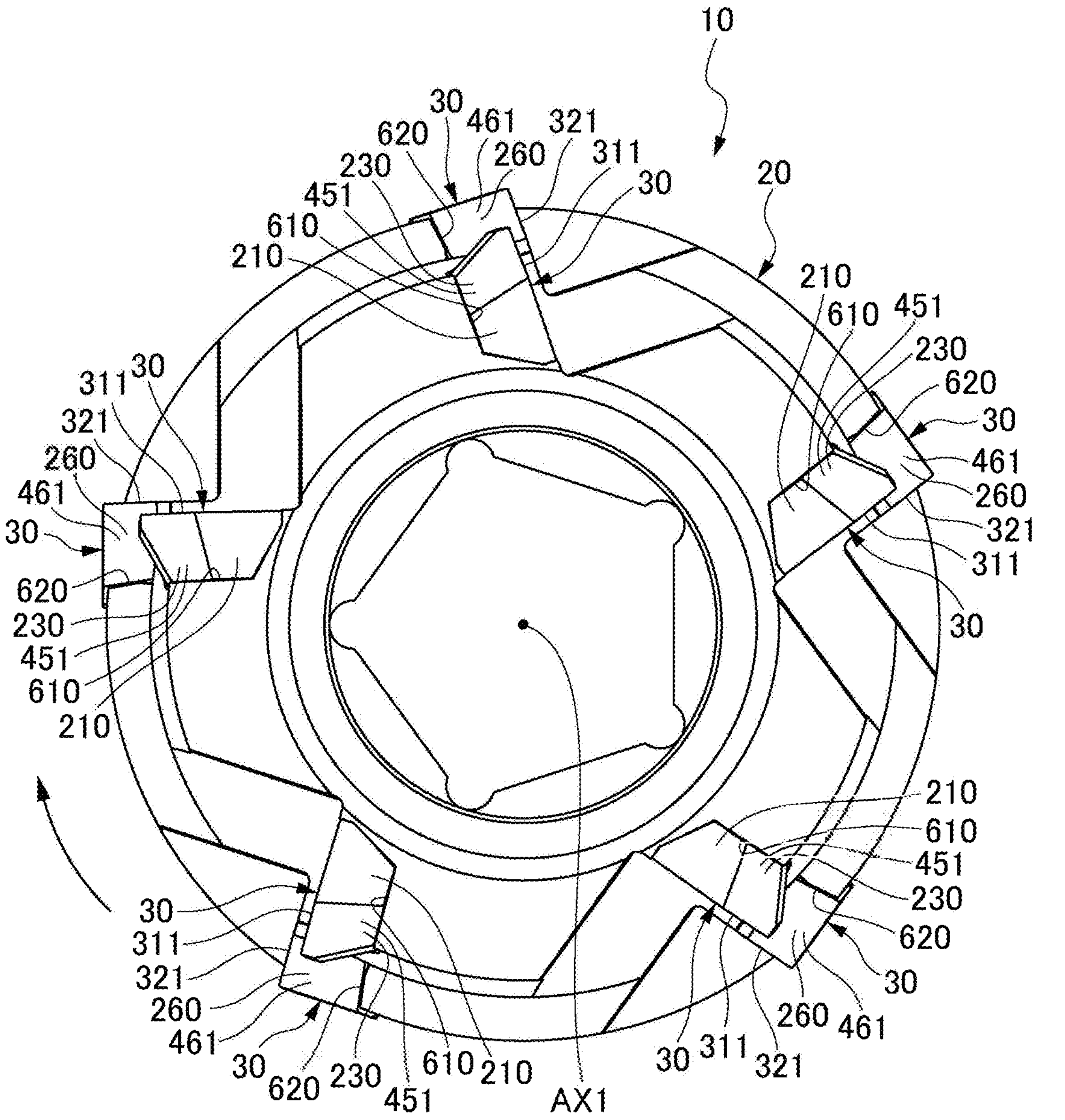
FIG. 2 is a front view of the cutting tool equipped with the cutting inserts according to the present embodiment.

FIG. 1 is a perspective view showing an external appearance of the cutting tool 10. FIG. 2 is a front view of the cutting tool 10 in FIG. 1 as viewed from the front end side along a rotation center axis AX1. As shown in FIGS. 1 and 2, the cutting tool 10 is equipped with a plurality of cutting inserts 30, which are mounted on a body 20.

The body 20 is a main part of the cutting tool 10. By being fitted, for example, in a holder such as an arbor, the body 20 is gripped together with the holder by a non-illustrated machine tool. The body 20 has a substantially circularly cylindrical shape, and a center axis of the body 20 coincides with the rotation center axis AX1. During machining, the body 20 rotates around the rotation center axis AX1 by driving force of the machine tool. In FIGS. 1 and 2, a rotational direction of the body 20 is indicated by an arrow.

Figure 3:
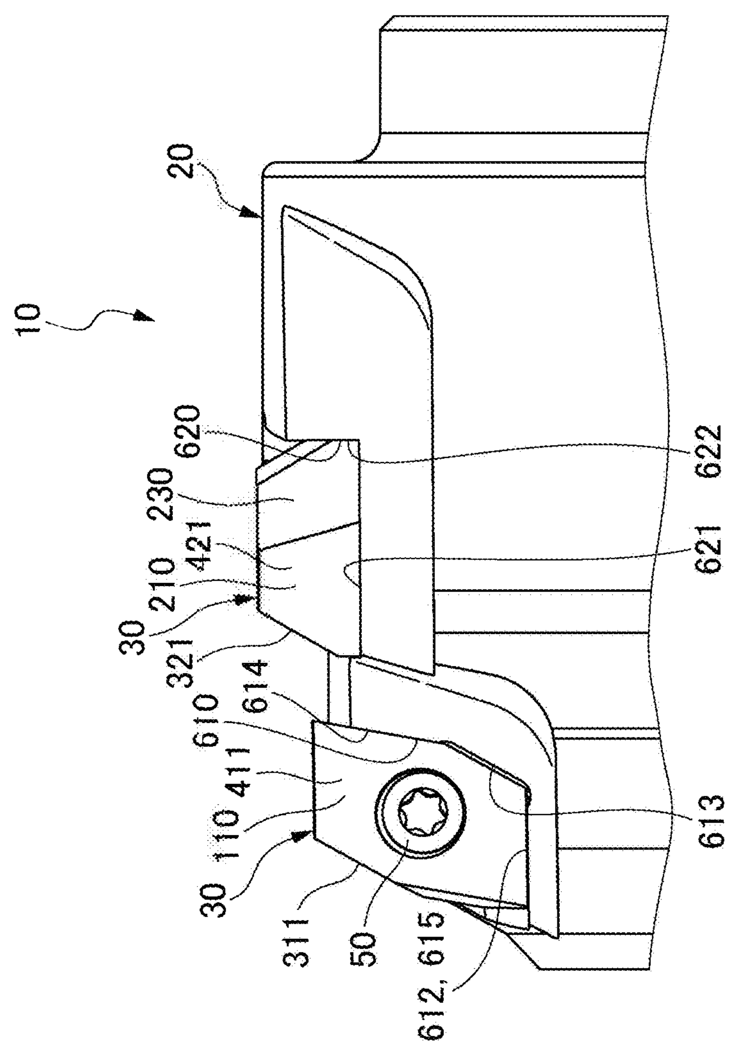
FIG. 3 is a side view of a first mounting seat and second mounting seat fitted with the cutting inserts in the cutting tool.
Figure 4:
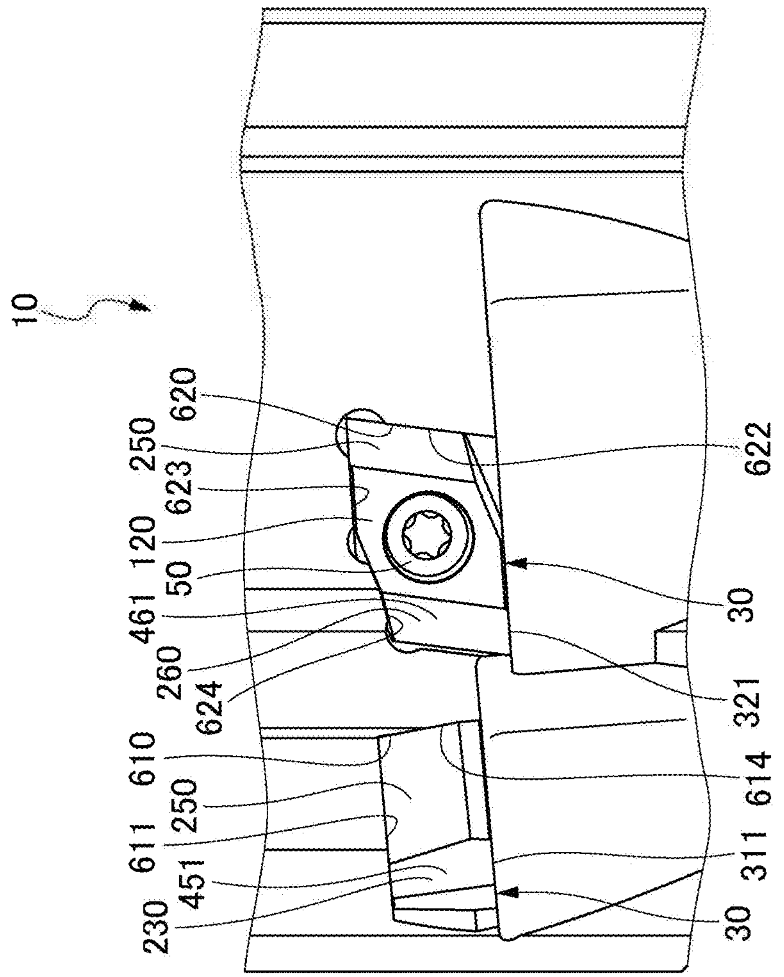
FIG. 4 is a plan view of the first mounting seat and second mounting seat fitted with the cutting inserts in the cutting tool.

As shown in FIGS. 3 and 4, the body 20 includes a plurality of first mounting seats 610 and a plurality of second mounting seats 620. The first mounting seats 610 are arranged at equal intervals in a circumferential direction, and so are the second mounting seats 620. The first mounting seats 610 and the second mounting seats 620 are arranged along the rotation center axis AX1. The first mounting seats 610 are provided on a front end of the body 20 and the second mounting seats 620 are placed on a rear end side of the first mounting seats 610 on the body 20.

The cutting insert 30 is a member on which a first cutting edge 311, a second cutting edge 321, or the like for use to cut a workpiece is formed. A plurality of the cutting inserts 30 are formed on the body 20 as described above. All the cutting inserts 30 are identical in shape. Each of the cutting inserts 30 is mounted on the first mounting seat 610 or the second mounting seat 620 on the body 20 using a screw 50. The cutting insert 30 is fitted to the body 20 via the first mounting seat 610 by being placed in a first posture or fitted to the body 20 via the second mounting seat 620 by being placed in a second posture.

A configuration of the cutting insert 30 will be described with reference to FIGS. 5 to 8, and with reference to FIGS. 3 and 4 as required. The cutting insert 30 includes end faces 110 and 120, as well as first side faces 210 and 220, second side faces 230 and 240, third side faces 250 and 260, and fourth side faces 270 and 280, all of which connect between the end faces 110 and 120. The end face 110 is a plane projecting toward the viewer in FIG. 5 and the end face 120 is a plane receding away from the viewer in FIG. 5. The end faces 110 and 120 are mutually parallel planes opposed to each other. One of the end faces, i.e., the end face 110, functions as a first cutting face 411 during machining.

The end face 110 is generally hexagonal in shape and is marked off by six sides 111, 112, 113, 114, 115, and 116. Of the six sides, the sides 111 and 114 are a pair of sides parallel to each other, the sides 112 and 115 are also a pair of sides parallel to each other, and moreover, the sides 113 and 116 are a pair of sides parallel to each other.

As with the end face 110, the other end face 120 is also generally hexagonal in shape and is marked off by six sides 121, 122, 123, 124, 125, and 126. Of the six sides, the sides 121 and 124 are a pair of sides parallel to each other, the sides 122 and 125 are also a pair of sides parallel to each other, and moreover, the sides 123 and 126 are a pair of sides parallel to each other.

The sides 111, 112, 113, 114, 115, and 116 as well as the sides 121, 122, 123, 124, 125, and 126 can be said to be ridges crossing the end faces 110 and 120, the first side faces 210 and 220, the second side faces 230 and 240, the third side faces 250 and 260, and the fourth side faces 270 and 280.

The first side faces 210 and 220, which are opposed to each other, are part of surfaces that abut mounting surfaces of the first mounting seat 610 when the cutting insert 30 is mounted on the first mounting seat 610 and function as second cutting faces 421 and 422 during machining when the cutting insert 30 is mounted on the second mounting seat 620. The first side face 210, which is generally trapezoidal in shape, is marked off by four sides 201, 124, 202, and 116. Of the four sides, the sides 124 and 116 are parallel to each other. As with the first side face 210, the other first side face 220 is generally trapezoidal in shape and is marked off by four sides 204, 121, 205, and 113. Of the four sides, the sides 121 and 113 are parallel to each other.

The second side faces 230 and 240, which are opposed to each other, function as primary flanks 451 and 452 during machining when the cutting insert 30 is mounted on the first mounting seat 610. The second side face 230, which is generally trapezoidal in shape, is marked off by four sides 202, 123, 203, and 111. Of the four sides, the sides 123 and 111 are parallel to each other. As with the second side face 230, the other second side face 240 is generally trapezoidal in shape and marked off by four sides 205, 126, 206, and 114. Of the four sides, the sides 126 and 114 are parallel to each other.

The third side faces 250 and 260, which are opposed to each other, are part of surfaces that abut mounting surfaces of the first mounting seat 610 when the cutting insert 30 is mounted on the first mounting seat 610 and function as secondary flanks 461 and 462 during machining when the cutting insert 30 is mounted on the second mounting seat 620. The third side face 250 is generally rectangular in shape and marked off by four sides 203, 122, 204, 112. Of the four sides, the sides 203 and 204 are parallel to each other and the sides 122 and 112 are parallel to each other. As with the third side face 250, the other third side face 260 is generally rectangular in shape and marked off by four sides 206, 125, 201, and 115. Of the four sides, the sides 206 and 201 are parallel to each other and the sides 125 and 115 are parallel to each other.

The fourth side faces 270 and 280, which are opposed to each other, are part of surfaces that abut mounting surfaces of the first mounting seat 610 and mounting surfaces of the second mounting seat 620, respectively, when the cutting insert 30 is mounted on the body 20.

A total of four cutting edges (two first cutting edges 311 and 312 and two second cutting edges 321 and 322) are formed on the cutting insert 30.

Figure 5:
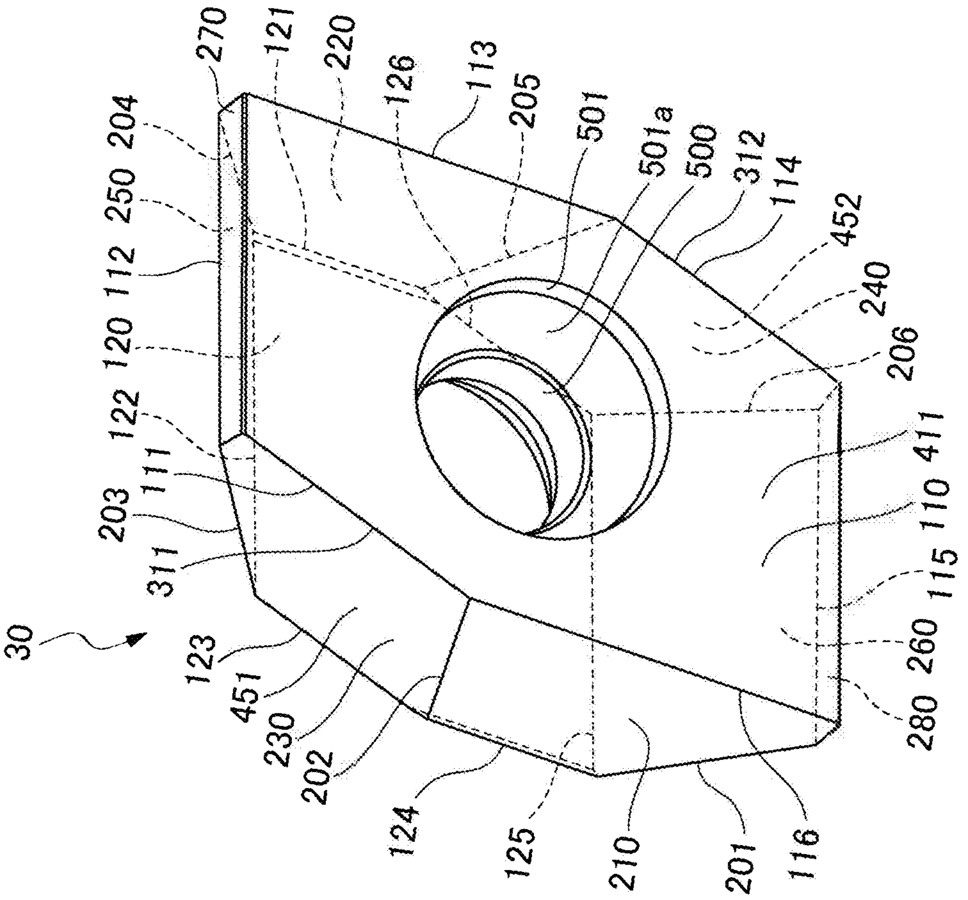
FIG. 5 is a perspective view of the cutting insert in a first posture.

Of the four cutting edges formed on the cutting insert 30, the two first cutting edges 311 and 312 are both formed along a side marking off a first end face 110 (see FIG. 5). Specifically, the first cutting edge 311 is provided along the side 111 in the same position as the side 111 and the first cutting edge 312 is provided along the side 114 in the same position as the side 114. In the cutting insert 30, the first cutting edges 311 and 312 are equal in length to each other.

Of the four cutting edges formed on the cutting insert 30, the two second cutting edges 321 and 322 are formed along a side marking off the first side faces 210 and 220. Specifically, the second cutting edge 321 is provided along the side 201 of the first side face 210 in the same position as the side 201 and the second cutting edge 322 is provided along the side 204 of the first side face 220 in the same position as the side 204. The second cutting edges 321 and 322 are equal in length to each other.

Note that only one of a plurality of cutting edges on the cutting insert 30 actually functions as a "cutting edge" during machining. Which of the first cutting edges 311 and 312 and the second cutting edges 321 and 322 functions as a "cutting edge" varies with the mounting state of the cutting insert 30 on the body 20.

In the first posture in which the cutting insert 30 is mounted on the first mounting seat 610 of the body 20, one of the first cutting edges 311 and 312 located on the foremost side actually functions as a "cutting edge." On the cutting insert 30, when the first cutting edge 311 functions as a cutting edge, the end face 110 serving as the first cutting face 411 actually functions as a "cutting face" and the second side face 230 serving as the primary flank 451 actually functions as a "flank." On the cutting insert 30, when the first cutting edge 312 functions as a cutting edge, the end face 110 serving as the first cutting face 411 actually functions as a "cutting face" and the second side face 240 serving as the primary flank 452 actually functions as a "flank."

Figure 6A:
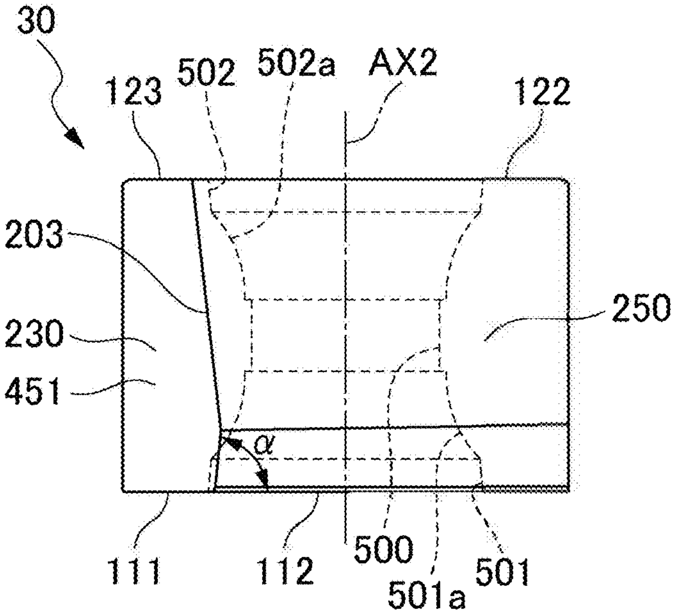
FIG. 6A is a plan view of the cutting insert in the first posture and FIG. 6B is a side view of the cutting insert in the first posture.

A wedge angle formed between the end face 110 serving as the first cutting face 411 and the second side face 230 serving as the primary flank 451 on opposite sides of the first cutting edge 311 and a wedge angle formed between the end face 110 serving as the first cutting face 411 and the second side face 240 serving as the primary flank 452 on opposite sides of the first cutting edge 312 are both $\alpha$-degree angles, which are smaller than 90 degrees (see FIG. 6A). That is, the first cutting edges 311 and 312 have a wedge angle $\alpha$ smaller than 90 degrees.

In the second posture in which the cutting insert 30 is mounted on the second mounting seat 620 of the body 20, one of the second cutting edges 321 and 322 located on the foremost side actually functions as a "cutting edge." On the cutting insert 30, when the second cutting edge 321 functions as a cutting edge, the first side face 210 serving as the second cutting face 421 actually functions as a "cutting face" and the third side face 260 serving as the secondary flank 461 actually functions as a "flank." On the cutting insert 30, when the second cutting edge 322 functions as a cutting edge, the first side face 220 serving as the second cutting face 422 actually functions as a "cutting face" and the third side face 250 serving as the secondary flank 462 actually functions as a "flank."

Figure 8A:
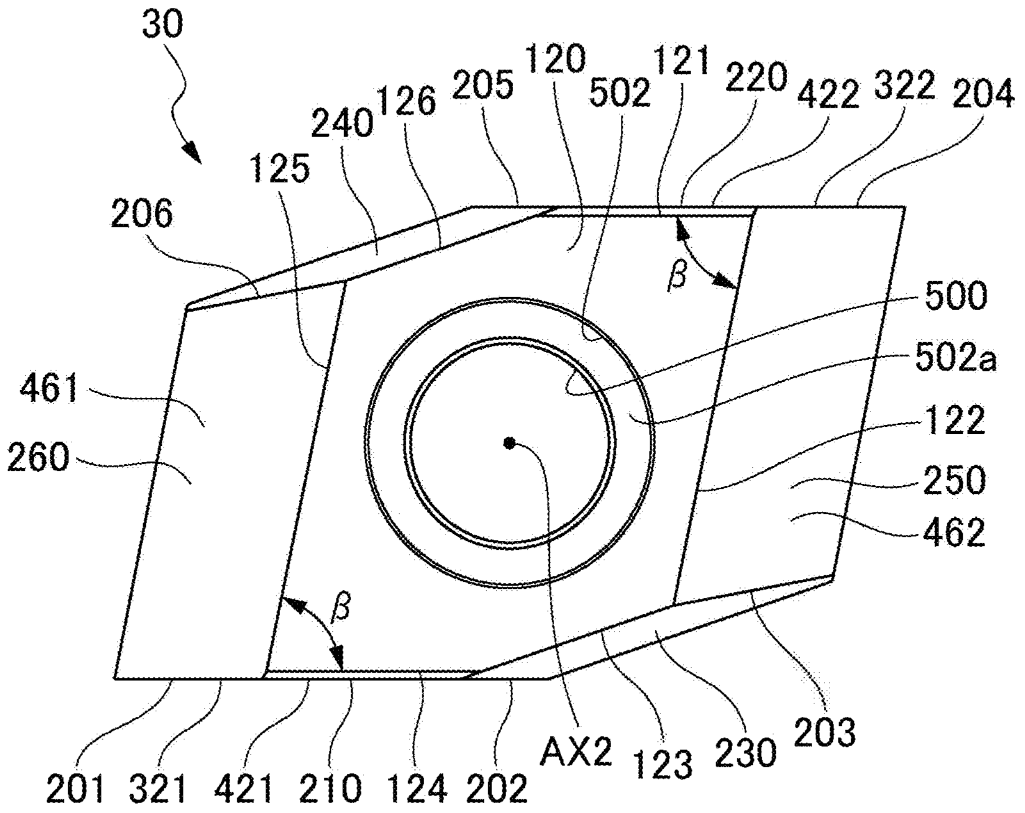
FIG. 8A is a plan view of the cutting insert in the second posture and FIG. 8B is a side view of the cutting insert in the second posture.
Figure 8B:
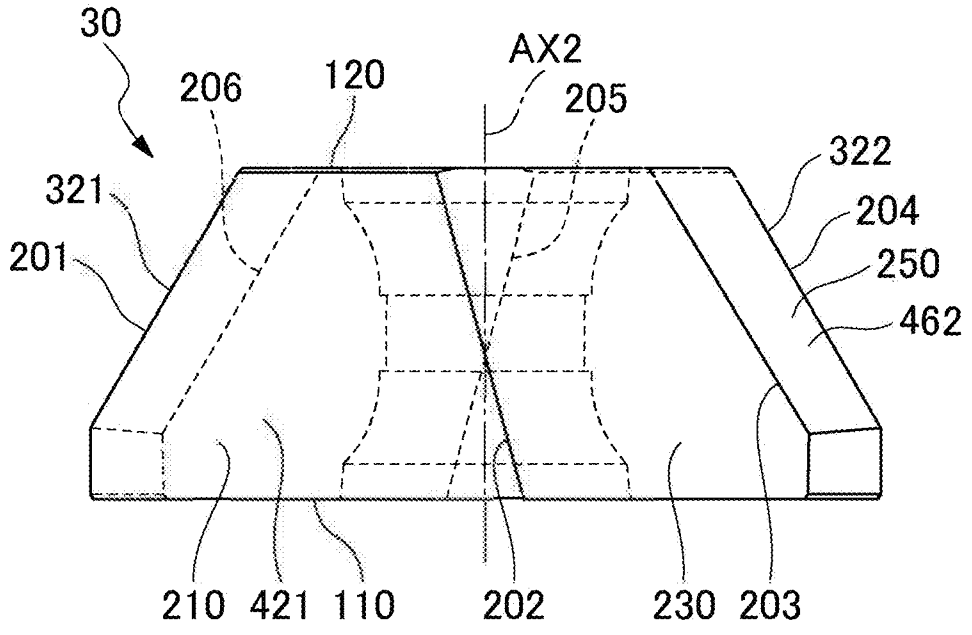

A wedge angle formed between the first side face 210 serving as the second cutting face 421 and the third side face 260 serving as the secondary flank 461 on opposite sides of the second cutting edge 321 and a wedge angle formed between the first side face 220 serving as the second cutting face 422 and the third side face 250 serving as the secondary flank 462 on opposite sides of the second cutting edge 321 are both β-degree angles which are smaller than 90 degrees (see FIG. 8). That is, the second cutting edges 321 and 322 have a wedge angle β smaller than 90 degrees.

The cutting insert 30 has a through-hole 500. The through-hole 500 is formed extending from the end face 110 to the other end face 120. The through-hole 500 is formed perpendicularly to the end faces 110 and 120 in which openings 501 and 502 are formed. The openings 501 and 502 of the through-hole 500 open on the end faces 110 and 120. Near the openings 501 and 502, the through-hole 500 includes reduced-diameter parts 501*a* and 502*a* tapering toward an intermediate part of the through-hole 500.

The through-hole 500 is used to pass the screw 50 therethrough in fixing the cutting insert 30 to the body 20 and the screw 50 is inserted through either of the openings 501 and 502. A head of the screw 50 passed through the through-hole 500 is engaged with either of the reduced-diameter parts 501*a* and 502*a*. That is, when the screw 50 is inserted through the opening 501, the head of the screw 50 is engaged with the reduced-diameter part 501*a* on the side of the opening 501, and when the screw 50 is inserted through the opening 502, the head of the screw 50 is engaged with the reduced-diameter part 502*a* on the side of the opening 502.

Figure 6B:
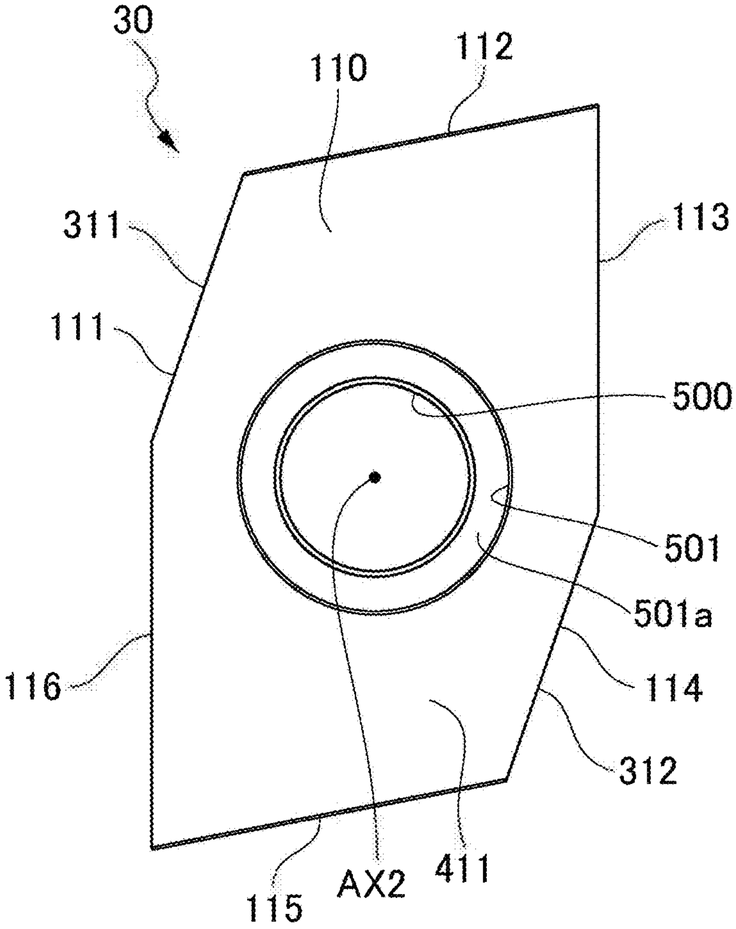
Figure 7:
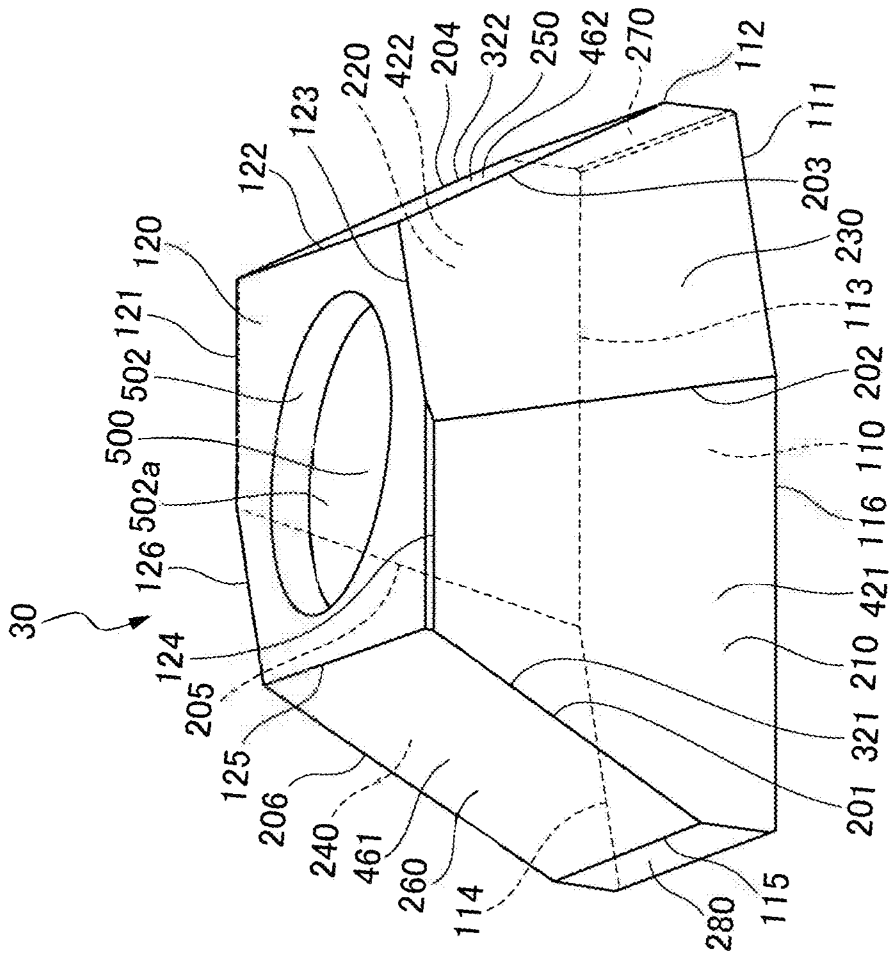
FIG. 7 is a perspective view of the cutting insert in a second posture.

An axis AX2 shown in FIGS. 6 and 8 passes through the center of the through-hole 500. The axis AX2 passes through the geometric center of an external shape of the entire cutting insert 30. When the cutting insert 30 is rotated 180 degrees around the axis AX2, the entire post-rotation shape of the cutting insert 30 is superimposed on the pre-rotation shape of the cutting insert 30. The existence of the axis AX2 depends on the fact that the shape of the cutting insert 30 has symmetry such as described so far.

For example, in a state in which the first cutting edge 311 functions as an actual "cutting edge" with the cutting insert 30 being in the first posture by being fitted on the first mounting seat 610 of the body 20, if the cutting insert 30 is mounted on the first mounting seat 610 of the body 20 while being rotated 180 degrees around the axis AX2, the first cutting edge 312 functions as an actual "cutting edge."

Similarly, for example, in a state in which the second cutting edge 321 functions as an actual "cutting edge" with the cutting insert 30 being in the second posture by being fitted on the second mounting seat 620 of the body 20, if the cutting insert 30 is mounted on the second mounting seat 620 of the body 20 while being rotated 180 degrees around the axis AX2, the second cutting edge 322 functions as an actual "cutting edge."

As shown in FIGS. 3 and 4, the first mounting seat 610 and second mounting seat 620 provided on the body 20 are arranged along the rotation center axis AX1. The first mounting seat 610 is provided on the front end of the body 20 and the second mounting seat 620 is placed on a rear end side of the first mounting seat 610 on the body. Consequently, along the rotation center axis AX1 (FIG. 1), the cutting insert 30 fitted in the second posture is placed on the rear side of the cutting insert 30 fitted in the first posture. The first mounting seat 610 is formed radially inward of the second mounting seat 620 on the body 20. Therefore, the cutting insert 30 fitted in the second posture on the rear side along the rotation center axis AX1 is placed radially outward of the cutting insert 30 fitted in the first posture on the front end side of the body 20.

The first mounting seat 610 of the body 20, on which the cutting insert 30 is fitted in the first posture, includes a first mounting surface 611, a second mounting surface 612, a third mounting surface 613, a fourth mounting surface 614, and a fifth mounting surface 615. The first mounting surface 611 is located on the rear side of the first mounting seat 610 in the rotational direction and a screw hole (not shown) into which the screw 50 is screwed is formed in the first mounting surface 611. The second mounting surface 612 and the fifth mounting surface 615 are located on the radially inner side of the first mounting seat 610. The third mounting surface 613 and the fourth mounting surface 614 are located on the rear side of the first mounting seat 610 along the rotation center axis AX1. Note that the third mounting surface 613 according to the present embodiment is out of contact with the cutting insert 30.

The second mounting seat 620 of the body 20, on which the cutting insert 30 is fitted in the second posture, includes a first mounting surface 621, a second mounting surface 622, a third mounting surface 623, and a fourth mounting surface 624. The first mounting surface 621 is located on the radially inner side and a screw hole (not shown) into which the screw 50 is screwed is formed in the first mounting surface 621. The second mounting surface 622 is located on the rear side of the second mounting seat 620 along the rotation center axis AX1. The third mounting surface 623 and the fourth mounting surface 624 are located on the rear side of the second mounting seat 620 in the rotational direction.

Next, description will be given of how the cutting insert 30 is mounted on the body 20.

(Mounting the Cutting Insert 30 on the First Mounting Seat 610)

(1) when the First Cutting Edge 311 is Used

When the first cutting edge 311 is used as an actual "cutting edge" by fitting the cutting insert 30 on the first mounting seat 610, with the first cutting edge 311 directed toward the front end side of the body 20, the cutting insert 30 in the first posture is fitted on the first mounting seat 610. Consequently, the end face 120 of the cutting insert 30 is abutted against the first mounting surface 611, the third side face 260 and the fourth side face 280 are abutted against the second mounting surface 612 and the fifth mounting surface 615, respectively, the second side face 240 is opposed to the third mounting surface 613, and the first side face 220 is abutted against the fourth mounting surface 614.

In this state, the screw 50 is inserted into the through-hole 500 in the cutting insert 30 through the opening 501 and screwed into a screw hole in the first mounting surface 611 of the first mounting seat 610. Consequently, the cutting insert 30 is fitted on the first mounting seat 610 of the body 20 in the first posture in which the first cutting edge 311 is used as an actual "cutting edge."

(2) when the First Cutting Edge 312 is Used

When the first cutting edge 312 is used as an actual "cutting edge" by fitting the cutting insert 30 on the first mounting seat 610, with the first cutting edge 312 directed toward the front end side of the body 20, the cutting insert 30 in the first posture is fitted on the first mounting seat 610. Consequently, the end face 120 of the cutting insert 30 is abutted against the first mounting surface 611, the third side face 250 and the fourth side face 270 are abutted against the second mounting surface 612 and the fifth mounting surface 615, respectively, the second side face 230 is opposed to the third mounting surface 613, and the first side face 210 is abutted against the fourth mounting surface 614.

In this state, the screw 50 is inserted into the through-hole 500 in the cutting insert 30 through the opening 501 and screwed into the screw hole in the first mounting surface 611 of the first mounting seat 610. Consequently, the cutting insert 30 is fitted on the first mounting seat 610 of the body 20 in the first posture in which the first cutting edge 312 is used as an actual "cutting edge."

(Mounting the Cutting Insert 30 on the Second Mounting Seat 620)

(1) When the Second Cutting Edge 321 is Used

When the second cutting edge 321 is used as an actual "cutting edge" by fitting the cutting insert 30 on the second mounting seat 620, with the second cutting edge 321 directed toward the front end side of the body 20, the cutting insert 30 in the second posture is fitted on the second mounting seat 620. Consequently, the end face 110 of the cutting insert 30 is abutted against the first mounting surface 621, the fourth side face 270 is abutted against the second mounting surface 622, the first side face 220 is abutted against the third mounting surface 623, and the second side face 240 is abutted against the fourth mounting surface 624.

In this state, the screw 50 is inserted into the through-hole 500 in the cutting insert 30 through the opening 502 and screwed into the screw hole in the first mounting surface 621 of the second mounting seat 620. Consequently, the cutting insert 30 is fitted on the second mounting seat 620 of the body 20 in the second posture in which the second cutting edge 321 is used as an actual "cutting edge."

(2) when the Second Cutting Edge 322 is Used

When the second cutting edge 322 is used as an actual "cutting edge" by fitting the cutting insert 30 on the second mounting seat 620, with the second cutting edge 322 directed toward the front end side of the body 20, the cutting insert 30 in the second posture is fitted on the second mounting seat 620. Consequently, the end face 110 of the cutting insert 30 is abutted against the first mounting surface 621, the fourth side face 280 is abutted against the second mounting surface 622, the first side face 210 is abutted against the third mounting surface 623, and the second side face 230 is abutted against the fourth mounting surface 624.

In this state, the screw 50 is inserted into the through-hole 500 in the cutting insert 30 through the opening 502 and screwed into the screw hole in the first mounting surface 621 of the second mounting seat 620. Consequently, the cutting insert 30 is fitted on the second mounting seat 620 of the body 20 in the second posture in which the second cutting edge 322 is used as an actual "cutting edge."

As described above, the cutting insert 30 according to the present embodiment makes it possible to use two first cutting edges 311 and 312, with one of end faces, i.e., the end face 110, serving as the first cutting face 411 as well as to use two second cutting edges 321 and 322, with a pair of the first side faces 210 and 220, which are opposed to each other, serving as the second cutting faces 421 and 422, respectively. That is, by changing a posture, orientation, and the like, of the cutting insert 30 mounted on the body 20, a total of four cutting edges can be used by switching.

The first cutting edges 311 and 312 have a wedge angle α smaller than 90 degrees. This makes it possible to reduce the cutting resistance occurring during cutting done using the first cutting edges 311 and 312.

Similarly, the second cutting edges 321 and 322 have a wedge angle β smaller than 90 degrees. This makes it possible to reduce the cutting resistance occurring during cutting done using the second cutting edges 321 and 322.

With the body 20 and cutting tool 10 according to the present embodiment, by fitting the cutting insert 30 on each of the first mounting seat 610 and the second mounting seat 620 on the body 20, cutting can be done simultaneously using the first cutting edges 311 and 312 of the cutting insert 30 in the first posture and the second cutting edges 321 and 322 of the cutting insert 30 in the second posture.

In particular, since the first mounting seat 610 and the second mounting seat 620 are arranged one behind the other on the body 20 along the rotation center axis AX1, the cutting inserts 30 can be fitted on the front end side and the rear end side. Consequently, for example, rough machining and finish machining can be performed in a single cutting machining using the cutting insert 30 on the front end side and the cutting insert 30 on the rear end side, respectively. By fitting the cutting inserts 30 in the front and rear, the cutting edge length of the tool as a whole can be increased, accommodating deep cutting.

Figure 9:
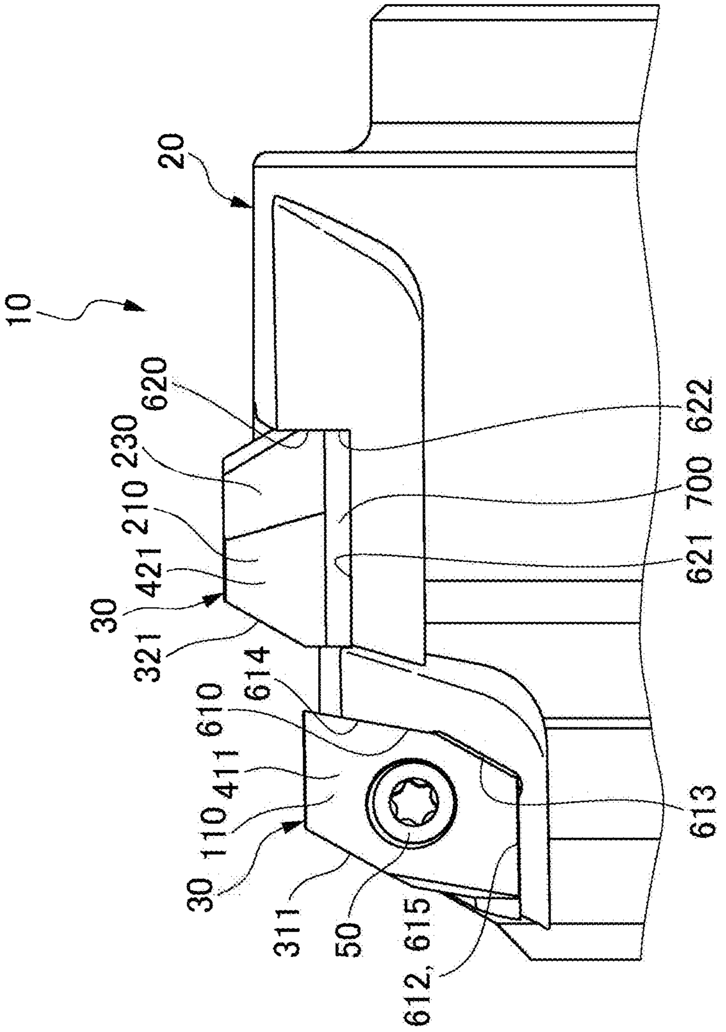
FIG. 9 is a side view of the first mounting seat and second mounting seat fitted with the cutting inserts in the cutting tool.

According to the present embodiment, the first posture of the cutting insert 30 fitted on the first mounting seat 610 is a horizontal posture in which a thickness direction of the cutting insert 30 coincides with the rotational direction and the second posture of the cutting insert 30 fitted on the second mounting seat 620 is a vertical posture in which a width direction of the cutting insert 30 coincides with the rotational direction. Consequently, as shown in FIG. 9, on the second mounting seat 620 on which the cutting insert 30 is fitted in the second posture, i.e., the vertical posture, by fixing the cutting insert 30 to the first mounting surface 621 with a screw threaded therethrough and via a shim plate 700 therebetween, fitting position of the cutting insert 30 can easily be moved radially outward. That is, by interposing the shim plate 700 between the first mounting surface 621 and the cutting insert 30, the tool diameter can be adjusted easily.

According to the present embodiment, the cutting insert 30 has a greater width dimension in a direction orthogonal to the first side faces 210 and 220 than in a direction orthogonal to the end faces 110 and 120. Therefore, if the second mounting seat 620 on which the cutting insert 30 is fitted on the body 20 in the second posture, i.e., the vertical posture is provided on the front end side, and the first mounting seat 610 on which the cutting insert 30 is fitted in the first posture, i.e., in the horizontal posture is provided on the rear end side, tool life can be extended by placing the cutting insert 30 in the vertical posture that provides greater durability on the front end side on which the cutting insert 30 is subject to greater cutting resistance.

REFERENCE SIGNS LIST

10 Cutting tool
20 Body
30 Cutting insert
110 End face
111, 114 Side
201, 204 Side
210, 220 First side face
311, 312 First cutting edge
321, 322 Second cutting edge
411 First cutting face
421, 422 Second cutting face

451, 452 Primary flank
461, 462 Secondary flank
610 First mounting seat
620 Second mounting seat

What is claimed is:

1. A cutting insert configured to be mounted on a body of a cutting tool, the cutting insert comprising:

a first cutting face hexagonal in shape by being made up of one of a pair of end faces opposed to each other;

a pair of first cutting edges formed along a pair of sides opposed to each other among sides marking off the first cutting face;

second cutting faces trapezoidal in shape by being made up of a pair of side faces opposed to each other; and second cutting edges each formed along one of sides marking off each of the second cutting faces.

2. The cutting insert according to claim 1, further comprising primary flanks placed on opposite side of the respective first cutting edges from the first cutting face, wherein angles between the first cutting face and the primary flanks are smaller than 90 degrees.

3. The cutting insert according to claim 1, further comprising secondary flanks placed on opposite side of the respective second cutting edges from the respective second cutting faces, wherein angles between the second cutting faces and the respective secondary flanks are smaller than 90 degrees.

4. A body to which a cutting insert is fitted, wherein the cutting insert includes a first cutting face hexagonal in shape by being made up of one of a pair of end faces opposed to each other, a pair of first cutting edges formed along a pair of sides opposed to each other among sides marking off the first cutting face, second cutting faces trapezoidal in shape by being made up of a pair of side faces opposed to each other, and second cutting edges each formed along one of sides marking off each of the second cutting faces, the body comprising:

a first mounting seat on which the cutting insert is fitted by being placed in a first posture in which the first cutting edges are usable as cutting edges for use during cutting; and a second mounting seat on which the cutting insert is fitted by being placed in a second posture in which the second cutting edges are usable as cutting edges for use during cutting.

5. The body according to claim 4, wherein the first mounting seat and the second mounting seat are arranged in an axial direction.

6. A cutting tool comprising:

a cutting insert including: a first cutting face hexagonal in shape by being made up of one of a pair of end faces opposed to each other, a pair of first cutting edges formed along a pair of sides opposed to each other among sides marking off the first cutting face, second cutting faces trapezoidal in shape by being made up of a pair of side faces opposed to each other, and second cutting edges each formed along one of sides marking off each of the second cutting faces; and a body including: a first mounting seat on which the cutting insert is fitted by being placed in a first posture in which the first cutting edges are usable as cutting edges for use during cutting, and a second mounting seat on which the cutting insert is fitted by being placed in a second posture in which the second cutting edges are usable as cutting edges for use during cutting.

7. The cutting tool according to claim 6, wherein the cutting insert includes primary flanks placed on opposite side of the respective first cutting edges from the first cutting face; and angles between the first cutting face and the primary flanks are smaller than 90 degrees.

8. The cutting tool according to claim 6, wherein the cutting insert includes secondary flanks placed on opposite side of the respective second cutting edges from the respective second cutting faces; and angles between the second cutting faces and the respective secondary flanks are smaller than 90 degrees.

9. The cutting tool according to claim 6, wherein the first mounting seat and the second mounting seat are arranged in an axial direction on the body.

* * * * *